United States Patent
Magon et al.

(10) Patent No.: US 8,123,639 B2
(45) Date of Patent: Feb. 28, 2012

(54) CARBOXYLATED ACRYLONITRILE BUTADIENE LATEX SEAMLESS BLADDER AND A PROCESS FOR MANUFACTURING THEREOF

(75) Inventors: Prem Nath Magon, Jalandhar (IN); Ashwani Magon, Jalandhar (IN)

(73) Assignee: Paradise Rubber Industries, Jalandhar (IN)

( * ) Notice: Subject to any disclaimer, the term of this patent is extended or adjusted under 35 U.S.C. 154(b) by 254 days.

(21) Appl. No.: 12/526,748

(22) PCT Filed: Feb. 12, 2008

(86) PCT No.: PCT/IN2008/000085
§ 371 (c)(1),
(2), (4) Date: Aug. 11, 2009

(87) PCT Pub. No.: WO2008/099421
PCT Pub. Date: Aug. 21, 2008

(65) Prior Publication Data
US 2010/0029419 A1 Feb. 4, 2010

(30) Foreign Application Priority Data
Feb. 13, 2007 (IN) .............................. 283/DEL/2007

(51) Int. Cl.
*A63B 41/02* (2006.01)
(52) U.S. Cl. ...................................... 473/609; 428/35.7
(58) Field of Classification Search .......... 473/603–605, 473/609, 610; 428/35.7, 36.8
See application file for complete search history.

(56) References Cited

U.S. PATENT DOCUMENTS

| 4,191,375 | A | | 3/1980 | Uruba | |
|---|---|---|---|---|---|
| 4,331,738 | A | * | 5/1982 | Kuan | 428/494 |
| 4,830,373 | A | | 5/1989 | Dehnert | |
| 5,772,545 | A | | 6/1998 | Ou | |
| 6,390,941 | B1 | | 5/2002 | Ou | |
| 6,544,608 | B1 | * | 4/2003 | Jain et al. | 428/35.7 |
| 6,793,597 | B2 | | 9/2004 | Awan | |
| 7,078,453 | B1 | * | 7/2006 | Feeney et al. | 524/493 |
| 7,119,138 | B1 | * | 10/2006 | Feeney et al. | 524/450 |
| 7,537,814 | B2 | * | 5/2009 | McInnis et al. | 428/36.8 |
| 2003/0017286 | A1 | * | 1/2003 | Williams et al. | 428/35.2 |
| 2003/0216199 | A1 | * | 11/2003 | Summerfield | 473/588 |

FOREIGN PATENT DOCUMENTS

| EP | 0511 681 A1 | 11/1992 |
|---|---|---|
| EP | 109 0660 A1 | 4/2001 |
| EP | 1090 660 A1 | 4/2001 |
| EP | 1621 235 A1 | 2/2006 |
| EP | 165 0237 A1 | 4/2006 |
| EP | 1650 237 A1 | 4/2006 |
| WO | WO 01/10512 A1 | 2/2001 |

OTHER PUBLICATIONS

International Search Report dated Jul. 28, 2008.

* cited by examiner

*Primary Examiner* — Steven Wong
(74) *Attorney, Agent, or Firm* — Fitch Even Tabin & Flannery LLP (57) ABSTRACT

A soft seamless acrylonitrile bladder having excellent air permeability combined with good bounce characteristics for inflatable balls obtained by latex dipping process. The said process involves dipping hot molds in a coagulant bath of calcium nitrate and water and later dipping the dried, coagulant coated formers in a compounded latex bath of carboxylated acrylonitrile butadiene latex, the dip being single or multiple depending upon the desired wall thickness. The said latex dipping process allows low manufacturing cost, high productivity and low rejection rate bladders having uniform weight varying from 500 mg/inch$^2$ to 1.5 g/inch$^2$, modulus varying from 17 to 20 Kg/Cm$^2$, tensile strength of 150-180 Kg/Cm2 and elongation at break 650-750%.

23 Claims, 2 Drawing Sheets

Figure 1

Figure 2

CARBOXYLATED ACRYLONITRILE BUTADIENE LATEX SEAMLESS BLADDER AND A PROCESS FOR MANUFACTURING THEREOF

CROSS-REFERENCE TO RELATED APPLICATIONS

This Application is a U.S. national phase application filed under 35 U.S.C. §371 of International Application No. PCT/IN2008/000085, filed Feb. 12, 2008, designating the United States, which claims priority from Indian Patent Application No.: 283/DEL/2007, filed Feb. 13, 2007, which are hereby incorporated herein by reference in their entirety for all purposes.

FIELD OF THE INVENTION

The present invention relates to a carboxylated acrylonitrile butadiene latex seamless bladder and a process for manufacturing thereof.

Particularly, it relates to a carboxylated acrylonitrile butadiene latex seamless bladder for hand stitched inflatable balls and a process for manufacturing thereof.

BACKGROUND OF THE INVENTION

A bladder is an independently saleable commodity. If it is employed in medical applications for gas transfusion etc., it can be employed without any outer cover thereon. However, if it is employed in sport industry for manufacture of balls, particularly for inflatable balls, then it is covered with an outer cover to protect it from bursting and to form a ball. The outer cover is either hand stitched or machine stitched depending upon the game in which it is being used or the desired characteristics and quality of the end product. The hand stitched outer cover is required, for example, in match and practice balls, and machine stitched cover is required, for example, in match and practice balls including promotional balls wherein the volume of demand is relatively higher. The term promotional balls means the balls used by manufacturers and/or promoters to promote their products and events, such as during trade fairs, national games, international games, etc. The physical characteristics of bladder for both types of outer covers are different.

The present invention particularly relates to a carboxylated acrylonitrile butadiene latex seamless bladder, which is particularly suitable for hand stitched inflatable balls. However, it may be understood that the scope of present invention is not restricted by use of disclosed seamless bladder for hand stitched inflatable balls, because surprisingly the present bladder being suitable for hand stitched inflatable balls has also been found suitable for machine stitched balls including, but not limited to inflatable balls, and also for medical applications including gas transfusion.

For inflatable balls, the film for manufacturing a bladder is not only required to be of suitable weight, but is also required to have controlled inflation capability when inflated as a bladder, to give required shape and size of the ball and to protect the bladder made from such film as well as the outer cover from de-shaping and bursting on inflation.

On the contrary, for medical applications, such as for manufacturing hand gloves, the film for manufacturing the gloves is neither required to be of a suitable weight nor required to have controlled inflation capability as it is neither required to have bounce characteristics nor to be inflated as a bladder to have a particular shape and size, nor is required to be protected from de-shaping and bursting on inflation.

It has been observed that for manufacturing a hand glove, even a very lighter film having weight varying from about 100 to about 200 mg/inch$^2$ is sufficient because, as stated, it is neither required to have any bounce characteristics nor to have a shape as in case of a ball. Further, the glove is not required to be stitched to any outer cover.

On the contrary, it has been observed that for hand stitched inflatable balls, the film for manufacturing a bladder is required to have relatively very heavy weight varying from about 500 to about 700 mg/inch$^2$, which has been found suitable for providing the shape and bounce characteristics to the hand stitched balls, because the outer cover of the ball and its stitches are strong enough.

Similarly, for machine stitched inflatable balls, it has been observed that the film for manufacturing a bladder is required to have even further heavier weight varying from about 700 mg/inch$^2$ to about 1.5 g/inch$^2$, which has been found suitable for providing the shape and bounce characteristics to the machine stitched balls, because the outer cover of such balls and its stitches are not strong enough as compared to hand stitched balls.

Therefore, a film used for manufacturing a hand glove cannot be employed for manufacturing a bladder suitable for a ball.

It has been further observed that in conventional balls, if bladder is not made of a film having a required weight and controlled inflation capability, the required weight and controlled inflation capability is, then, generally achieved by applying one or more layers of thread breading around the outer layer of the bladder, which has been found to result in increase in the hardness of the bladder, and hence, the bladder does not remain suitable for playing football, and additionally it looses its spherical shape.

In conventionally available inflatable balls, the bladder made from butyl rubber is used. However, such bladders are not of required weight. In case of butyl rubber bladders, the required weight is achieved by increasing its wall thickness which is determined based on the weight required by employing molding process which is conventionally carried out on an unsupported film made by pasting four panels and not on a bladder per se.

The major problem of manufacturing a butyl rubber bladder having required weight by increasing its wall thickness by molding is that the cost of material increases manifold.

Further, the major problem of the molding process is that it cannot be employed if a seamless bladder is required. As present invention aims of providing a seamless bladder, the molding process, therefore, is not suitable.

Still further problem of molding process is that even the joints are not of uniform weight, that is, weight at the joints of the bladder is relatively higher adversely resulting in wobbling effect during flight of the ball.

Yet another problem of molding process is that it has been found to be more expensive, and yet resulting in higher rejection, and hence, effectively lower production rate with higher capital cost.

Further, it has been observed that even by manufacturing the butyl rubber bladder by molding process, the required weight cannot be achieved. Therefore, in case of conventionally available bladders thread breading of nylon fiber around butyl bladder is applied to achieve the desired weight characteristics, which has been found to enhance controlled inflation capability of the bladder produced, but as stated herein, the thread breading results in increase in the hardness of the bladder, and hence, makes it unsuitable for playing football, and additionally loss of its spherical shape.

In U.S. Pat. No. 4,191,375, issued on Mar. 4, 1980, a game ball having an inner bladder provided with a layer of yarn fiber is discussed.

The U.S. Pat. No. 4,830,373, issued to Dehnert et al, describes a soccer ball which includes an inflatable floating bladder comprising two ply of butyl within a thread form of carcass.

The U.S. Pat. Nos. 5,772,545 and 6,390,941 B1 issued to Ou describe use of strengthened nylon thread overlapping each other to form a web like layer which permanently embraces and adheres to the bladder and supports the outer cover of the ball.

The U.S. Pat. No. 6,793,597 describes machine stitched ball with floating bladder. It consists of bladder and the outer cover wherein the outer cover is vulcanized with web of thread and adhesive. Further, the outer surface of the bladder is coated with the silicone releasing chemical before winding.

However, it has been observed that the fiber is applied around outer layer of the bladder in the form of a web like structure which does not allow bladder to inflate more than it has initially inflated for the purpose of breading by nylon fiber. Therefore, such bladders suffer from problem of limited inflation.

Further, as stated herein, it has been observed that due to thread breading, the bladder becomes harder, which limits its applications and wide acceptability because harder is the bladder, the players are hit harder during playing, for example, while kicking, heading etc. This problem can be overcome, but by providing additional padding between thread breading of the bladder and outer cover of the ball, which in-turn adds on the cost of the end product-ball, and hence make it commercially unviable.

Further, when a bladder is used in sports industry, it is desired that it should have judicious combination of bounce as well as air retention characteristics without sacrificing one property for the another property.

It has been observed that bladders made from synthetic butyl rubber exhibit good air retention characteristics, but have poor bounce characteristics. Such bladders have been accepted, but the need for seamless bladder having judicious combination of good air retention characteristics and good bounce characteristics, and still having low manufacturing cost, high productivity and low rejection rate has not been satisfied.

Further, the bladders made from natural rubber exhibit good bounce characteristics, but have poor air retention characteristics. Such bladders have also been accepted, but the need for seamless bladder having judicious combination of good air retention characteristics and good bounce characteristics, and still having high productivity and low rejection rate has not been satisfied.

It has been observed that even the bladders made from conventionally used synthetic latex exhibit good air retention characteristics, but have poor bounce characteristics.

Further, it has been observed by the inventors of the present invention that when a bladder is made from synthetic latex, particularly from synthetic acrylonitrile butadiene latex, the processability of the synthetic latex to have a film of desired thickness and weight is not possible.

It has been found that bladders made from synthetic acrylonitrile butadiene latex film are of thickness varying up to about 0.20 mm. The main drawback of a film of synthetic acrylonitrile butadiene latex having such a lower thickness is that stripping of film becomes very difficult.

Further, the inventors of the present invention have found that if a film of synthetic acrylonitrile butadiene latex for manufacture of a bladder having thickness more than about 0.25 mm is achieved, then drying problem is observed during manufacture of a film which in-turn has been found to cause cracks in the film.

It has been further found that bladders made from synthetic acrylonitrile butadiene latex film are of weight varying up to about 300 mg/inch$^2$, which as described herein, have not been found suitable for providing the shape and bounce characteristics even of the hand stitched balls, because as described herein, a film to manufacture a bladder suitable for hand stitched inflatable balls should have relatively very heavy weight varying from about 500 to about 700 mg/inch$^2$ and for machine stitched inflatable balls should have even further heavier weight varying from about 700 mg/inch$^2$ to about 1.5 g/inch$^2$.

Still another problem observed with synthetic acrylonitrile butadiene latex is that it results in a film having modulus varying from about 10 to 12 Kg/Cm$^2$ at 100% stretch [or elongation], which has been found to be a main cause of resulting in a bladder having poor bounce characteristics.

Yet another problem observed with synthetic acrylonitrile butadiene latex is that it results in a film having poor cross-linking as found by measuring tensile strength which has been found to be varying from 60 to 70 kg/cm$^2$ and elongation at break which has been found to be varying from 450 to 500%. Such a poor cross-linking has been found to be another cause of resulting in a bladder having poor bounce characteristics as well as reduced air retention characteristics.

Even further it has been observed that bladder made from film of synthetic acrylonitrile butadiene latex gets tear-off from its neck during stripping from a mould resulting in total loss of production.

Further, such bladders made from conventionally used synthetic latex do not have required bounce and controlled inflation characteristics. Therefore, such bladders have not been commercially acceptable.

Therefore, it can be concluded that the conventionally used synthetic latex, particularly the synthetic acrylonitrile butadiene latex is not suitable for manufacturing a film suitable for manufacturing a bladder for inflatable balls.

Further, the bladders made from natural latex exhibit good bounce characteristics, but have poor air retention characteristics. Such bladders have been accepted, but the need for a bladder having judicious combination of good air retention characteristics and good bounce characteristics, and still having low manufacturing cost, high productivity and low rejection rate has not been satisfied.

Accordingly, it has been found that when conventionally available bladders are made either from conventionally used synthetic rubber or synthetic latex, or from conventionally used natural rubber or natural latex, these have either poor air retention characteristics or poor bounce characteristics. Therefore, neither the bladders made from conventionally used synthetic rubber or synthetic latex, nor the bladders made from conventionally used natural rubber or natural latex have been commercially acceptable.

Therefore, a need to have a bladder having judicious combination of bounce characteristics as well as air retention characteristics, and controlled inflation capability without sacrificing one property for the another property has been felt for an inflatable ball.

An attempt has been made to manufacture bladders by employing blends of natural rubber and synthetic rubber.

However, it has been found that even bladders made from blends of natural rubber and synthetic-rubber suffer primarily from poor curing, i.e. cross linking, which in-turn results in low bounce characteristics. Even blends of synthetic rubber with natural rubber have not been able to result in a bladder having good bounce as well as good air retention characteristics.

Another problem of bladders made from blends of natural rubber and synthetic rubber is that these are not seamless as these are made by employing molding process, and hence, do not have uniform weight over the entire area, which in-turn results in an inflatable ball having wobbling effects, and therefore, higher rejection rate of the bladders and balls made therefrom.

Still another attempt has been made to manufacture bladders by employing blends of natural latex and synthetic latex, wherein such bladders are manufactured by employing dipping process, and wherein synthetic latex is selected from a group consisting of synthetic acrylonitrile butadiene latex, neoprene [for example polychloroprene latex], isoprene [for example, polyisoprene latex], SBR [styrene butadiene rubber] and natural latex is commonly known as centrifuged latex.

However, it has been found that even bladders made from blends of natural latex and synthetic latex suffer primarily from poor curing, i.e. cross linking, which in-turn results in low bounce characteristics. Even blends of synthetic latex with natural latex have not been able to result in a bladder having good bounce as well as good air retention characteristics.

Accordingly, it has been found that when conventionally available bladders are made either from blends of natural rubber and synthetic rubber or from blends of natural latex and synthetic latex, these have poor curing, and hence, have poor bounce characteristics, and in-addition bladders made from blends of natural rubber and synthetic rubber are not seamless bladders. Therefore, neither the bladders made from natural rubber and synthetic rubber nor the bladders made from natural latex and synthetic latex have not been acceptable, because these bladders also lack judicious combination of good air retention characteristics and good bounce characteristics.

Yet another attempt has been made to manufacture bladders by employing laminates of natural latex and synthetic latex, wherein synthetic latex is selected from a group consisting of synthetic acrylonitrile butadiene latex, neoprene [for example polychloroprene latex], isoprene [for example, polyisoprene latex], SBR [styrene butadiene rubber] and natural latex is commonly known as centrifuged latex.

However, it has been found that even bladders made from laminates of natural latex and synthetic latex primarily suffer not only from poor curing, i.e. cross linking, which in-turn results in low bounce characteristics, but also from problem of delamination of layers of the laminate, which in-turn results in bursting during performance, and hence, further rejection of the bladder. Accordingly, even laminates of natural latex and synthetic latex have not been able to result in a bladder having good bounce as well as good air retention characteristics, and good strength of the laminate per se to result in strong enough bladder.

Therefore, it has been found that even the bladders made from laminates of natural latex and synthetic latex have not been commercially acceptable.

Even another attempt to manufacture bladders by employing laminates of natural rubber and synthetic rubber has not been commercially successful.

It has been found that even bladders made from laminates of natural rubber and synthetic rubber primarily suffer not only from poor curing, i.e. cross linking, which in-turn results in low bounce characteristics, but also from problem of delamination of layers of the laminate, which in-turn results in bursting during performance, and further rejection of the bladder. Accordingly, even laminates of natural rubber and synthetic rubber have not been able to result in a bladder having good bounce as well as good air retention characteristics, and good strength of the laminate per se to result in strong enough bladder.

NEED OF THE INVENTION

Therefore, there is a need to have a seamless bladder and a process for manufacturing thereof, wherein the bladder has judicious combination of good air retention characteristics as well as good bounce characteristics without sacrificing one property for the another property, and the process for manufacturing thereof has low manufacturing cost, high productivity and low rejection rate, and the bladder is suitable for hand stitched as well as machine stitched inflatable balls.

OBJECTS OF THE INVENTION

Figure 1:
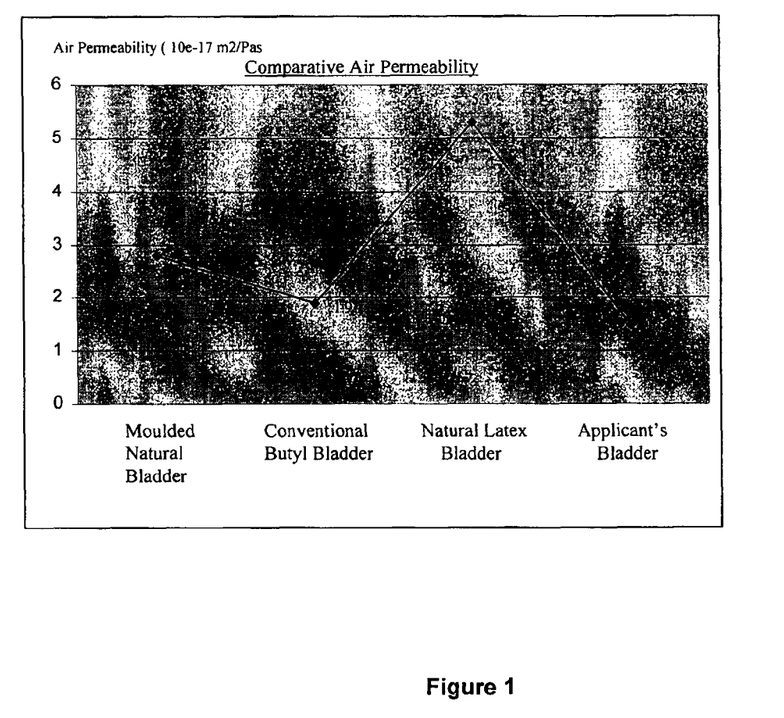
FIG. 1 illustrates comparative air permeability of molded natural bladder, conventional butyl bladder, natural latex bladder and applicant's bladder. As can be observed from FIG. 1, applicant's bladder has air permeability of $1.5*10^{-17}$.
Figure 2:
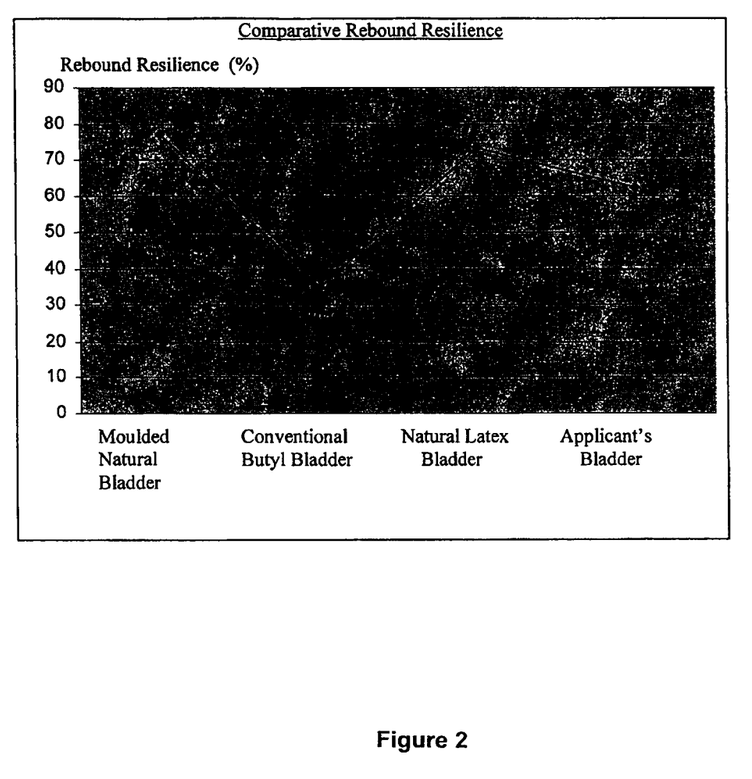
FIG. 2 illustrates comparative rebound resilience of moulded natural bladder, conventional butyl bladder, natural latex bladder and applicant's bladder. As can be observed from FIG. 1, applicant's bladder has rebound resilience of 62.41%.

Accordingly, main object of the present invention is to provide a seamless bladder and a process for manufacturing thereof, wherein the bladder has judicious combination of good air retention characteristics as well as good bounce characteristics without sacrificing one property for the another property, and the process for manufacturing thereof has low manufacturing cost, high productivity and low rejection rate, and the bladder is suitable for hand stitched as well as machine stitched inflatable balls.

This is also an object of the present invention to provide a seamless bladder which is made from a synthetic latex, which is particularly a carboxylated acrylonitrile butadiene latex and not selected from a group consisting of synthetic acrylonitrile butadiene latex, neoprene, isoprene, SBR.

Another object of the present invention is to provide a seamless bladder, which is capable of protecting its outer cover from bursting whether it is hand stitched or machine stitched, and hence, has wider acceptability and applicability.

Still another object of the present invention is to provide a seamless bladder, which not only has required and suitable weight, but also has required controlled inflation, and hence, is capable of giving required shape and size of the ball and protecting the outer cover from de-shaping and bursting on inflation.

Yet another object of the present invention is to provide a seamless bladder, wherein its film has weight varying from about 500 mg/inch$^2$ to about 1.5 g/inch$^2$, and hence, is suitable not only for providing the shape and bounce characteristics to a hand stitched ball, but also to a machine stitched ball.

This is also an object of the present invention to provide a seamless bladder, wherein its required weight and controlled inflation capability is achieved without applying layers of thread breading around its outer layer, and hence, it has reduced hardness, and therefore, it does not require additional padding, and still has wider applications and wider acceptability, because it does remain suitable for playing football, and additionally it does not loose its spherical shape.

This is also an object of the present invention to provide a seamless bladder, wherein controlled inflation capability is not achieved by applying layers of thread breading around its outer layer in the form of a web like structure, and hence, it does not suffer from problem of limited inflation.

This is also an object of the present invention to provide a seamless bladder, wherein required weight is achieved by increasing its wall thickness, which is determined based on the weight required, by employing dipping process, and not by molding process, and hence, it is capable of overcoming drawbacks of a molding process, which as described herein is conventionally carried out on an unsupported film made by pasting four panels and not on a bladder per se.

Accordingly, this is also an object of the present invention to provide a bladder, wherein it is manufactured by a process which is capable of resulting in a seamless bladder having no joints, and hence, having uniform weight, and therefore, having no wobbling effect during flight of the ball, and still with no substantial increase in cost of material and process per se, and still having increased production rate with substantially reduced capital cost and rejection rate.

This is an object of the present invention to provide a bladder, which is manufactured by a process which is not only capable of resulting in a seamless bladder, but is also capable of resulting in a bladder made of film having desired thickness varying from about 0.30 mm to 3.0 mm, and weight varying from about 500 mg/inch$^2$ to about 1.5 g/inch$^2$ without any problem of processability, and hence, having no stripping problem and no drying problem, and therefore, having no cracks in the film.

This is also an object of the present invention to provide a seamless bladder having modulus varying from about 17 to 20 Kg/Cm$^2$ at 100% stretch [or elongation], which has been found to be a main cause of resulting in a bladder having good bounce characteristics.

This is also an object of the present invention to provide a seamless bladder having good tensile strength varying from about 150 to 180 kg/cm$^2$ and elongation at break varying from 650 to 750%, and hence, good cross-linking, and therefore, having good bounce characteristics as well as good air retention characteristics.

This is also an object of the present invention to provide a seamless bladder which does not get tear-off from its neck during stripping from a mould, and hence, does not result in loss of production.

This is also an object of the present invention to provide a seamless bladder which is made from a single film, and hence, it does not suffer from problem of delamination of layers, and therefore, no problem of bursting during performance and further rejection thereof.

Other objects and advantages of the present invention will become more apparent from the following description when read in conjunction with the accompanying examples which are not intended to limit scope of the present invention. It may be noted that the accompanying examples are only for the illustration purpose.

DESCRIPTION OF THE INVENTION

Accordingly, the present invention relates to a seamless bladder having judicious combination of good air retention characteristics as well as good bounce characteristics without sacrificing one property for the another property, and being suitable for hand stitched as well as machine stitched inflatable balls, wherein the bladder is made from a synthetic latex, particularly from a carboxylated acrylonitrile butadiene latex and no other latex.

Accordingly, the present invention also relates to a process for manufacturing a seamless bladder from a synthetic latex, particularly from a carboxylated acrylonitrile butadiene latex and no other latex, wherein the bladder has judicious combination of good air retention characteristics as well as good bounce characteristics without sacrificing one property for the another property, and being suitable for hand stitched as well as machine stitched inflatable balls, and wherein the process has low manufacturing cost, high productivity and low rejection rate.

In accordance with one of the embodiments, the present invention relates to a carboxylated acrylonitrile butadiene latex seamless bladder, which is capable of protecting its outer cover from bursting whether it is hand stitched or machine stitched, and hence, has wider acceptability and applicability.

In accordance with one of the embodiments, the present invention relates to a carboxylated acrylonitrile butadiene latex seamless bladder having required and suitable weight and controlled inflation, and hence, being capable of giving required shape and size of the ball and protecting the outer cover from de-shaping and bursting on inflation.

In accordance with one of the embodiments, the present invention relates to a carboxylated acrylonitrile butadiene latex seamless bladder having weight varying from about 500 mg/inch$^2$ to about 1.5 g/inch$^2$, and hence, being suitable not only for providing the shape and bounce characteristics to a hand stitched ball, but also to a machine stitched ball.

In accordance with one of the embodiments, the present invention relates to a carboxylated acrylonitrile butadiene latex seamless bladder, wherein its required weight and controlled inflation capability is achieved without applying layers of thread breading around its outer layer, and hence, having reduced hardness, and therefore, not requiring additional padding, and still having wider applications and wider acceptability, and being suitable for playing football, and additionally not loosing its spherical shape.

In accordance with one of the embodiments, the present invention relates to a carboxylated acrylonitrile butadiene latex seamless bladder, wherein controlled inflation capability is not achieved by applying layers of thread breading around its outer layer in the form of a web like structure, and hence, it does not suffer from problem of limited inflation.

In accordance with one of the embodiments, the present invention relates to a carboxylated acrylonitrile butadiene latex seamless bladder, wherein required weight is achieved by increasing its wall thickness, which is determined based on the weight required, by employing dipping process, and not by molding process, and hence, being capable of overcoming drawbacks of a molding process, which is conventionally carried out on an unsupported film made by pasting four panels and not on a bladder per se.

In accordance with one of the embodiments, the present invention relates to a carboxylated acrylonitrile butadiene latex seamless bladder having no joints, and hence, having uniform weight, and therefore, having no wobbling effect during flight of the ball.

In accordance with one of the embodiments, the present invention relates to a carboxylated acrylonitrile butadiene latex seamless bladder having thickness varying from about 0.30 mm to 3.0 mm and weight varying from about 500 mg/inch$^2$ to about 1.5 g/inch$^2$.

In accordance with one of the embodiments, the present invention relates to a carboxylated acrylonitrile butadiene latex seamless bladder having no stripping problem and no drying problem, and therefore, having no cracks therein.

In accordance with one of the embodiments, the present invention relates to a carboxylated acrylonitrile butadiene latex seamless bladder having modulus varying from about 17 to 20 Kg/Cm$^2$ at 100% stretch [or elongation], and hence, having good bounce characteristics.

In accordance with one of the embodiments, the present invention relates to a carboxylated acrylonitrile butadiene latex seamless bladder having good tensile strength varying from about 150 to 180 kg/cm$^2$ and elongation at break varying from 650 to 750%, and hence, having good cross-linking, and therefore, having good bounce characteristics as well as good air retention characteristics.

In accordance with one of the embodiments, the present invention relates to a carboxylated acrylonitrile butadiene latex seamless bladder which does not get tear-off from its neck during stripping from a mould.

In accordance with one of the embodiments, the present invention relates to a carboxylated acrylonitrile butadiene latex seamless bladder which is made from a single film, and hence, does not suffer from problem of delamination of layers, and therefore, no problem of bursting during performance.

In accordance with one of the preferred embodiments, the present invention also relates to a bladder, wherein:
 the bladder is made from carboxylated acrylonitrile butadiene latex and no other latex; and
 the bladder has modulus varying from about 17 to 20 Kg/Cm$^2$ at 100% stretch [or elongation]; good tensile strength varying from about 150 to 180 kg/cm$^2$; elongation at break varying from 650 to 750%; and thickness varying from about 0.30 mm to 3.0 mm confirming its good cross-linking and good bounce characteristics as well as good air retention characteristics without sacrificing one property for the another property; and
 the bladder has weight varying from about 500 mg/inch$^2$ to about 1.5 g/inch$^2$ and has controlled inflation, wherein its required weight and controlled inflation capability is achieved without applying layers of thread breading around its outer layer confirming its reduced hardness even without requiring additional padding, and hence, having no problem of limited inflation; and
 the bladder has uniform weight and no joints, respectively, confirming its no wobbling effect during flight of the ball and seamless nature, and additionally no lose of its spherical shape, and
 the bladder is capable of providing required shape and size of the ball and protecting the outer cover from de-shaping and bursting on inflation whether the balls is hand stitched or machine stitched, and hence, having wider acceptability and applicability.

In accordance with one embodiment of the present invention, the carboxylated acrylonitrile butadiene latex is characterized by:—
 acrylonitrile copolymer with medium or high acrylonitrile level varying from about 26% to about 39%;
 solid content varying from about 39% to about 50% of dry rubber contents;
 pH value varying from about 7.5 to about 8.5;
 viscosity varying from about 14 to about 65 mPas;
 surface tension varying from about 30 to about 40 mN/m.

In accordance with one of the embodiments, the present invention relates to a bladder, wherein the bladder is made from a single film of carboxylated acrylonitrile butadiene latex, and hence, does not suffer from problem of delamination of layers, and therefore, no problem of bursting during performance.

In accordance with one of the preferred embodiments of present invention, it relates to a bladder, wherein required weight of the bladder is achieved by increasing its wall thickness, which is determined based on the weight required, by employing dipping process, and not by molding process, and hence, the bladder is capable of overcoming drawbacks of a molding process, which is conventionally carried out on an unsupported film made by pasting four panels and not on a bladder per se.

In accordance with another embodiment of the present invention, it relates to a process for manufacturing of a bladder, wherein it does not get tear-off from its neck during stripping from a mould, and hence, it does not have stripping problem.

In accordance with one of the embodiments, the present invention relates to a process for manufacturing a bladder, wherein it does not have drying problem, and therefore, does not have cracks in the bladder.

Accordingly, in one embodiment, the present invention also relates to a process for manufacturing a bladder from a synthetic latex, wherein the bladder has judicious combination of good air retention characteristics as well as good bounce characteristics, and is suitable for hand stitched as well as machine stitched inflatable balls, and wherein the process comprises following steps:—
 a) cleaning the multiple moulds by rinsing in an acid bath;
 b) heating the rinsed formers obtained from process step-a) by dipping in hot water;
 c) dipping the heated moulds from process step-b) in a coagulant bath;
 d) drying the coagulant coated formers obtained from process step-c);
 e) dipping the dried and coagulant coated formers obtained in process step-d) in compounded latex bath of carboxylated acrylonitrile butadiene latex;
 f) drying the latex coated coagulated films obtained from process step-e);
 g) beading the substantially dried latex coated coagulated films obtained from process step-f) to form a bead followed by leaching;
 h) drying and vulcanizing the leached formers with bladder obtained from process step-g);
 i) cooling and washing the vulcanized bladders obtained from process step-h), and
 j) stripping the cooled and washed bladders obtained from process step-i) from the respective moulds [formers];
 wherein the process is characterized by:—
  dipping the moulds in a coagulant bath while these are hot and having a temperature varying from about 50° C. to 70° C., and the coagulant bath is maintained at a temperature varying from about 20° C. to about 80° C.; and
  dipping the dried and coagulant coated formers in a compounded latex bath of carboxylated acrylonitrile butadiene latex when it is maintained at a temperature varying from about 10° C. to 30° C.

In accordance with one of the embodiments of the present invention, the process steps of dipping in coagulant bath and latex bath may be repeated more than once, preferably twice.

Accordingly, in one embodiment, the present invention also relates to a process for manufacturing a bladder from a synthetic latex, wherein the bladder has judicious combination of good air retention characteristics as well as good bounce characteristics, and is suitable for hand stitched as well as machine stitched inflatable balls, and wherein the process comprises following steps:—
  a) cleaning multiple moulds by rinsing in an acid bath;
  b) heating the rinsed formers obtained from process step-a) by dipping in hot water;
  c) dipping the heated moulds from process step-b) in first coagulant bath;
  d) drying the coagulant coated formers obtained from process step-c);
  e) dipping the dried and coagulant coated formers obtained in process step-d) in first compounded latex bath of carboxylated acrylonitrile butadiene latex;
  f) drying the latex coated coagulated films obtained from process step-e);
  g) dipping the dried latex coated coagulated films obtained from process step-f) in second coagulant bath;
  h) drying the second coagulant coated latex films obtained from process step-g);
  i) dipping the dried and second coagulant coated latex films obtained in process step-h) in second compounded latex bath of carboxylated acrylonitrile butadiene latex;
  j) drying the latex coated coagulated film obtained from process step-i);
  k) beading the substantially dried latex coated coagulated films obtained from process step-j) to form a bead followed by leaching;
  l) drying and vulcanizing the leached formers with bladder obtained from process step-k);
  m) cooling and washing the vulcanized bladders obtained from process step-l); and
  n) stripping the cooled and washed bladders obtained from process step-m) from the respective moulds [formers];
  wherein the process is characterized by:—
    dipping the moulds in a coagulant bath while these are hot and having a temperature varying from about 50° C. to 70° C., and the coagulant bath is maintained at a temperature varying from about 20° C. to about 80° C.;
    dipping the dried and coagulant coated formers in a compounded latex bath of carboxylated acrylonitrile butadiene latex when it is maintained at a temperature varying from about 10° C. to 30° C.
    the latex coated coagulated films obtained from process step-e) are not fully dried to avoid complete removal of moisture contents therefrom;
    the semi-dried latex coated coagulated films obtained from process step-f) are dipped in second or subsequent coagulant bath while these are maintained at a temperature varying from about 20° C. to about 80° C.;
    the dried and coagulant coated latex films obtained from process step-h) are dipped in second or subsequent compounded latex bath of carboxylated acrylonitrile butadiene latex while maintaining the latex bath at a temperature varying from about 10° C. to 30° C.

In accordance with present invention, the heated moulds are dipped into coagulant bath preferably for a duration varying from about 15 sec to about 60 sec. A care is taken that the moulds are dipped in coagulant bath while these are hot and having a temperature varying from about 50° C. to 70° C. Further, care is taken that the coagulant bath is maintained at a temperature varying from about 20° C. to about 80° C. The dipping, in accordance with present invention, of the hot formers in a coagulant bath respectively having said temperatures has been found to have advantage of resulting in uniform layer of the coagulant coat on the formers.

In accordance with present invention, the dried and coagulant coated formers are dipped in compounded latex bath of carboxylated acrylonitrile butadiene latex preferably for a duration varying from about 15 sec to 300 sec. A care is taken that the dried and coagulant coated formers are dipped in compounded carboxylated acrylonitrile butadiene latex bath when it is maintained at a temperature varying from about 10° C. to 30° C., which has been surprisingly found to have advantage of avoiding partial precure of the compounded carboxylated acrylonitrile butadiene latex, and hence, has been found to have advantage of resulting in a better wet gel strength of latex coating as evaluated by conventional chloroform test. Further, advantages of avoiding precure at this stage includes enhancement of film formation capability of the carboxylated acrylonitrile butadiene latex, and formation of a product having better tensile strength varying from about 150 to 180 kg/cm$^2$ and better elongation at break varying from 650 to 750%.

In accordance with one of the preferred embodiments of the present invention, the latex coated coagulated films are preferably dried in a hot air tunnel. A care is taken that temperature of the hot air tunnel is maintained within a range varying from about 40° C. to about 60° C. preferably for a duration varying from about 5 to about 50 min, which has been surprisingly found to have advantage of resulting in a uniform drying of the film without formation of cracks thereon, and entrapment of moisture and clogs therein. It has been found that if temperature of the hot air tunnel is maintained below 40° C., the duration of drying will substantially increase, which in-turn will enhance the cost of the overall process, and if temperature of the hot air tunnel is maintained above 60° C., then cracks are developed, and entrapment of moisture and clogs takes place, which in-turn results in rejection of the end product. A further care is taken that the latex coated coagulated film does not get fully dried, which has been found to have advantage of avoiding delamination of the subsequent latex coating from the coagulated film. However, it may be noted that scope of present invention is not restricted by drying the latex coated coagulated film in hot air tunnel. In one embodiment, it may be dried at ambient room temperature preferably under circulated air. However, if the film is dried at ambient temperature the process duration will substantially increase.

In accordance with one of the preferred embodiments of the present invention, when the process comprises more than once dipping in coagulant bath [first and second baths and so on] and latex bath [first and second baths and so on], then the semi-dried latex coated coagulated films obtained from preceding process step are dipped in second or subsequent coagulant bath preferably for a duration varying from about 5 sec to about 60 sec. A care is taken that the semi-dried latex coated coagulated films are dipped in second or subsequent coagulant bath while these are maintained at a temperature varying from about 20° C. to about 80° C. The dipping, in accordance with present invention, of the semi-dried latex coated coagulated film in second or subsequent coagulant bath having said temperature has been found to have advantage of resulting in continuously reducing water contents of the bath and to have smooth film formation.

In accordance with one of the preferred embodiments of the present invention, when the process comprises more than once dipping in coagulant bath [first and second baths and so on] and latex bath [first and second baths and so on], then the dried and second or subsequent coagulant coated latex films obtained in preceding process step are dipped in second or subsequent compounded latex bath of carboxylated acrylonitrile butadiene latex preferably for a duration varying from about 15 sec to 300 sec. A care is taken that the dried and second [and so on] coagulant coated films are dipped in second or subsequent compounded carboxylated acrylonitrile butadiene latex bath when it is maintained at a temperature varying from about 10° C. to 30° C., which has been surprisingly found to have advantage of avoiding partial precure of the compounded carboxylated acrylonitrile butadiene latex, and hence, result in a better wet gel strength of latex coating as evaluated by conventional chloroform test. Further, advantages of avoiding precure at this stage includes enhancement of film formation capability of the carboxylated acrylonitrile butadiene latex, and formation of a product having better tensile strength and elongation.

In accordance with present invention, the leached formers with bladder shell are dried at about 40° C. which is gradually increased up to 90° C., preferably for duration of about 10 to 55 min. The gradually drying has been found to have advantage of uniform drying to avoid entrapment of moisture between the films formed.

In accordance with present invention, the vulcanization is carried out at a temperature varying from about 90° C. to about 170° C., preferably for duration of about 10 to 55 min in a closed chamber.

In accordance with one of the embodiments of the present invention, the [first] coagulant bath for first dip comprises:—
- coagulating agent varying from about 10 parts to about 90 parts by weight of the total weight of the bath composition;
- parting agent varying from about 2 parts to about 8 parts by weight of the total weight of the bath composition; and
- optionally comprising a wetting agent varying from about 0.01 parts to about 0.5 parts by weight of the total weight of the bath composition; and
- optionally comprising a conventional defoamer or surface active agent varying from about 0.01 parts to about 0.5 parts by weight of the total weight of the bath composition;
- which are dissolved in water.

In accordance with one of the preferred embodiments of the present invention, the coagulant bath for first dip comprises:—
- coagulating agent, which is preferably calcium chloride or calcium nitrate;
- parting agent, which is preferably bentonite clay; and
- optionally comprising a wetting agent, which is preferably non-ionic group.

In accordance with one of the embodiments of the present invention, the [second] coagulant bath for second or subsequent dips comprises:—
- coagulating agent varying from about 10 parts to about 90 parts by weight of the total weight of the bath composition; and
- optionally comprises a wetting agent varying from about 0.01 parts to about 0.5 parts by weight of the total weight of the bath composition; and
- optionally comprises a conventional defoamer or surface active agent varying from about 0.01 parts to about 0.5 parts by weight of the total weight of the bath composition;
- which are dissolved in water.

In accordance with one of the preferred embodiments of the present invention, the coagulant bath for second or subsequent dips comprises:—
- coagulating agent, which is preferably calcium chloride or calcium nitrate; and
- optionally comprises a wetting agent, which is preferably non-ionic group.

In accordance with one embodiment of the present invention, the carboxylated acrylonitrile butadiene latex bath for all dips comprises dry parts of:—
- carboxylated acrylonitrile butadiene latex about 100 phr [per hundred rubber];
- ph modifier varying from about 0.3 to about 0.8 phr;
- surfactants varying from about 0.1 to about 3.0 phr;
- activator and vulcanizing agent varying from about 0.5 to about 5 phr;
- ultra fast accelerator varying from about 1 to about 3 phr;
- vulcanizing agent varying from about 0.25 to about 3.0 phr;
- plasticizer varying from about 1 to about 6 phr;
- antioxidant varying from about 1 to about 3 phr; and
- optionally comprising one or more of conventional colours, which are dissolved in water to have 25 to 55% of compounded latex bath.

In accordance with one of the preferred embodiments of the present invention, the carboxylated acrylonitrile butadiene latex bath for all dips comprises:—
- a ph modifier which is preferably about 2 to 3% potassium hydroxide [KOH] solution;
- a surfactant which is selected from a group comprising anionic group;
- an activator and vulcanizing agent which is preferably 50% dispersion of zinc oxide;
- an ultra fast accelerator which is preferably 50% dispersion of zinc diethyl dithiocarbamate [ZDEC] or of zinc dibutyl dithiocarbamate [ZDBC];
- a vulcanizing agent which is preferably 50% dispersion of sulphur or 33% dispersion of diphenilthiourea [DPTU];
- a plasticizer which is preferably 50% emulsion of dioctylephthalate;
- a antioxidant which is preferably 50% dispersion or emulsion of phenol, amine, aniline or hydroquinone.

In accordance with this invention, the parting agent is not added in the second coagulant bath which has been found to have advantage of avoiding delamination of the subsequent film.

In accordance with one embodiment of the present invention, the carboxylated acrylonitrile butadiene latex is characterized by:—
- acrylonitrile copolymer with medium or high acrylonitrile level varying from about 26% to about 39%;
- solid content varying from about 39% to about 50% of dry rubber contents;
- pH value varying from about 7.5 to about 8.5;
- viscosity varying from about 14 to about 65 mPas;
- surface tension varying from about 30 to about 40 mN/m.

In accordance with one of the preferred embodiments of the present invention, the moulds [or formers] are rinsed in a weak acid bath of an acid selected from acetic acid or nitric acid having acid bath concentration varying from about 2% to 4% by weight in luke warm water.

In accordance with one of the preferred embodiments of the present invention, the rinsed formers obtained from preceding process step are dipped in hot water maintained at a temperature varying from about 40° C. to about 90° C. to heat the moulds [formers] and to further clean them by removal of acid traces therefrom.

In accordance with one of the preferred embodiments of the present invention, the coagulant coated formers obtained from preceding process step are dried in hot air tunnel for a duration varying from about 15 sec to 5 min or at room temperature till the formers get fully dried.

In accordance with one of the preferred embodiments of the present invention, the second or subsequent coagulant coated latex films obtained from preceding process step are dried in hot air tunnel for a duration varying from about 15 sec to 15 min or at room temperature till the films get fully dried.

In accordance with one of the preferred embodiments of the present invention, the substantially dried latex coated coagulated film obtained from preceding process step is subjected to process steps of beading onto neck portion of the former to form a bead which has been found to facilitate its easy stripping without tearing-off at the neck portion followed by leaching in hot water bath to remove excess of unwanted chemicals.

In accordance with one of the preferred embodiments of the present invention, the vulcanized bladders are subjected to accelerated cooling and washing by sprinkling of cold water for a period varying from about 5 to about 10 min.

In accordance with one of the preferred embodiments of the present invention, the cooled and washed bladder shells are striped manually from the respective moulds [formers].

In accordance with one of the preferred embodiments of the present invention, the bladder shells are washed with luke warm water in a centrifuge chamber at a temperature varying from 40° C. to 60° C. to remove clay and other unwanted material.

In accordance with one of the preferred embodiments of the present invention, the washed bladder shells are dried in hot air tumbler for about 30 to 180 min at a temperature varying from 50° C. to 100° C. to remove water contents therefrom.

In accordance with one of the preferred, embodiments of the present invention, an air inlet valve is fixed onto the bladder shells, preferably at the neck portion and it is sealed to provide air tight joint and to form a bladder suitable for an inflatable ball.

In accordance with one of the preferred embodiments of the present invention, it has been observed that when a bladder is made by process of the present invention described herein for inflatable balls, it surprisingly has following characteristics:—
  good combination of good bounce characteristics as well as air retention characteristics;
  modulus varying from about 17 to 20 Kg/Cm$^2$ at 100% stretch [or elongation]; tensile strength varying from about 150 to 180 kg/cm$^2$; elongation at break varying from 650 to 750%; and thickness varying from about 0.30 mm to 3.0 mm;
  weight varying from about 500 mg/inch$^2$ to about 1.5 g/inch$^2$;
  uniform weight and no joints; and
  it is capable of providing required shape and size of the ball and protecting the outer cover from de-shaping and bursting on inflation of the inflatable balls.

Further, the process of present invention has been found to have low manufacturing cost without substantial increase in cost of material and process per se and still having increased production rate with substantially reduced capital cost and rejection rate.

The present invention is now explained with the help of following examples which are not intended to limit its scope but are incorporated for the illustration purposes.

EXAMPLE 1

The carboxylated acrylonitrile butadiene latex seamless bladder of present invention is manufactured in following steps:— a) Cleaning of moulds [or formers]—multiple moulds [or formers] are rinsed in a weak acid bath of acetic acid having acid bath concentration of 2.5% by weight in luke warm water;
b) Heating of the moulds [formers]—the rinsed formers obtained from process step-a) are dipped in hot water maintained at a temperature of about 70° C. to heat the moulds [formers] and to further clean them by removal of acid traces therefrom;
c) Dipping in first coagulant bath—the heated moulds from process step-b) are dipped into first coagulant bath for a duration of about 5-60 secs while these are hot and having a temperature of about 50-70° C. and the first coagulant bath is maintained at a temperature of about 20-80° C. to result in uniform layer of the coagulant coat on the formers;
d) Drying of coagulant coated formers—the coagulant coated formers obtained from process step-c) are dried in hot air tunnel for a duration of about 15 sec to 5 minutes till the formers get fully dried;
e) Dipping dried coagulant coated formers in first compounded latex bath—The dried and coagulant coated formers obtained in process step-d) are dipped in first compounded latex bath of carboxylated acrylonitrile butadiene latex for a duration of about 15-300 sec while maintaining temperature of first compounded carboxylated acrylonitrile butadiene latex bath at about 10-30° C. to avoid partial precure of the compounded carboxylated acrylonitrile butadiene latex, and hence, to result in a better wet gel strength as evaluated by conventional chloroform test, and to enhance film formation capability of the carboxylated acrylonitrile butadiene latex, and formation of a product having better tensile strength and elongation;
f) Drying of latex coated coagulated film—The latex coated coagulated film obtained from process step-e) is dried in a hot air tunnel while maintaining temperature of the hot air tunnel at about 40-60° C. for a duration of about 5-50 minutes to result in a uniform drying of the film without formation of cracks thereon, and entrapment of moisture and clogs therein till the latex coated coagulated film does not get fully dried to avoid delamination of the subsequent latex coatings from the coagulated film;
g) Dipping the semi-dried latex coated coagulated film in second coagulant bath—the semi-dried latex coated coagulated film obtained from process step-f) is dipped in second coagulant bath for a duration of about 5-60 sec while taking care that the semi-dried latex coated coagulated film is dipped in second coagulant bath while it is maintained at a temperature of about 20-80° C. to have continuously reducing water contents of the bath and to have smooth film formation;
h) Drying of second coagulant coated latex film—the second coagulant coated latex films obtained from process step-g) are dried in hot air tunnel for a duration of about 15 sec-15 minutes till the films get fully dried;
i) Dipping dried second coagulant coated latex films in second compounded latex bath—The dried and second coagulant coated latex films obtained in process step-h) are dipped in second compounded latex bath of carboxylated acrylonitrile butadiene latex for a duration of about 15-300 sec while taking care that the dried and second coagulant coated films are dipped in second compounded carboxylated acrylonitrile butadiene latex bath when it is maintained at a temperature of about 10-30° C. to avoid partial precure of the compounded carboxylated acrylonitrile butadiene latex, and to result in a better wet gel strength as evaluated by conventional chloroform test, and to enhance film formation capability of the carboxylated acrylonitrile butadiene latex, and formation of a product having better tensile strength and elongation;

j) Drying of latex coated coagulated film—The latex coated coagulated film obtained from process step-i) is dried in a hot air tunnel while taking care that temperature of the hot air tunnel is maintained at about 40-60° C. for a duration of about 5-50 min to result in a uniform drying of the film without formation of cracks thereon, and entrapment of moisture and clogs therein;

k) Beading and leaching—The substantially dried latex coated coagulated film obtained from process step-j) is subjected to process steps of beading onto neck portion of the former to form a bead so as to easy stripping of bladder shell without tearing-off at the neck portion; followed by leaching in hot water bath to remove excess of unwanted chemicals;

l) Drying and Vulcanization—The leached formers with bladder shell are dried at about 40° C. which is gradually increased up to 90° C. for a duration of about 10-55 min to have uniform drying to avoid entrapment of moisture between the films formed, which are vulcanized at a temperature of about 90-170° C. for a duration of about 10-55 min in a closed chamber;

m) Cooling and washing of vulcanized bladders—The vulcanized bladders are subjected to accelerated cooling and washing by sprinkling of cold water for a period of about 5-10 min;

n) Stripping of Bladders—The cooled and washed bladders are striped manually from the respective moulds [formers];

o) Post washing of bladder shells—The bladder shells are washed with luke warm water in a centrifuge chamber at a temperature of about 40-60° C. to remove clay and other unwanted material;

p) Post drying of bladder shells—The washed bladder shells are dried in hot air tumbler for about 3-180 min at a temperature of about 50-100° C. to remove water contents therefrom;

q) Fixation of valve on the bladder shells—An air inlet valve is fixed onto the bladder shells at the neck portion and it is sealed to provide air tight joint and to form a bladder suitable for an inflatable ball.

The first coagulant bath for example 1 has following composition:—

| Calcium Nitrate | 60 Parts |
|---|---|
| Water | 40 Parts |
| | 100 Parts |
| Bentonite Clay | 6-8% of Total Weight |
| Wetting Agent | 0.1% of Total Weight |
| Defoamer | 0.05% of Total Weight |

The second coagulant bath for example 1 has following composition:—

| Calcium Nitrate | 50 Parts |
|---|---|
| Water | 50 Parts |
| | 100 Parts |
| Wetting Agent | 0.2% of Total Weight |
| Defoamer | 0.05% of Total Weight |

The first latex bath for example 1 has following composition:—

| | Dry Parts |
|---|---|
| Carboxylated Acrylonitrile Butadiene Latex | 100.00 |
| KOH Solution (2-3% solution) pH Modifier | 0.3-0.8 |
| Surfactants | 0.1-3 |
| Zinc Oxide (50% Dispersion) | 3-5 |
| ZDC (50% dispersion) | 1-3 |
| Sulphur (50% Dispersion)/DPTU 33% Disp. | 0.25-3.0 |
| Plasisizer (DiOctylePhthalate) | 1-6 |
| Antioxidant (Phenol and amine) | 1-3 |
| Colour | As Required |

The second latex bath for example 1 has the similar composition as described above.

The bladder manufactured by above process was tested and found to have following characteristics:— good combination of good bounce characteristics as well as air retention characteristics;

modulus of about 17-20 Kg/Cm$^2$ at 100% stretch [or elongation];

tensile strength of about 150-180 kg/cm$^2$;

elongation at break of about 650-750%; and thickness of about 0.3-3.0 mm;

weight of about 500 mg/inch$^2$-1.5 gm/inch$^2$ no joints were observed; and it was found capable of providing required shape and size of the ball and protecting the outer cover from de-shaping and bursting on inflation thereof.

EXAMPLE 2

The carboxylated acrylonitrile butadiene latex seamless bladder of present invention is manufactured in following steps:— a) Cleaning of moulds [or formers]—multiple moulds [or formers] are rinsed in a weak acid bath of acetic acid having acid bath concentration of 2.5% by weight in luke warm water;

b) Heating of the moulds [formers]—the rinsed formers obtained from process step-a) are dipped in hot water maintained at a temperature of about 70° C. to heat the moulds [formers] and to further clean them by removal of acid traces therefrom;

c) Dipping in coagulant bath—the heated moulds from process step-b) are dipped into coagulant bath for a duration of about 5-60 sec while these are hot and having a temperature of about 50-70° C. and the coagulant bath is maintained at a temperature of about 20-80° C. to result in uniform layer of the coagulant coat on the formers;

d) Drying of coagulant coated formers—the coagulant coated formers obtained from process step-c) are dried in hot air tunnel for a duration of about 15 sec to 5 mins till the formers get fully dried;

e) Dipping dried coagulant coated formers in compounded latex bath—The dried and coagulant coated formers obtained in process step-d) are dipped in compounded latex bath of carboxylated acrylonitrile butadiene latex for a duration of about 15-300 sec while maintaining temperature of compounded carboxylated acrylonitrile butadiene latex bath at about 10-30° C. to avoid partial precure of the compounded carboxylated acrylonitrile butadiene latex, and hence, to result in a better wet gel strength as evaluated by conventional chloroform test, and to enhance film formation capability of the carboxylated acrylonitrile butadiene latex, and formation of a product having better tensile strength and elongation;

f) Drying of latex coated coagulated film—The latex coated coagulated film obtained from process step-e) is dried in a hot air tunnel while maintaining temperature of the hot air tunnel at about 40-60° C. for a duration of about 5-50 min to result in a uniform drying of the film without formation of cracks thereon, and entrapment of moisture and clogs therein till the latex coated coagulated film does not get fully dried to avoid delamination of the subsequent latex coatings from the coagulated film;

g) Drying of latex coated coagulated film—The latex coated coagulated film obtained from process step-f) is dried in a hot air tunnel while taking care that temperature of the hot air tunnel is maintained at about 40-60° C. for a duration of about 5-50 min to result in a uniform drying of the film without formation of cracks thereon, and entrapment of moisture and clogs therein.

The process steps beading and leaching, followed by drying and vulcanization followed by cooling and washing of vulcanized bladder shells followed by stripping of bladder shells, post washing and drying thereof and fixation of valve thereon are carried in same manner as in example 1.

The coagulant bath for example 2 has the same composition as described in example 1. The latex bath for example 2 has the same composition as described in example 1.

The bladder manufactured by above process was tested and found to have characteristics as illustrated herein:

Technical Report/M & R

Sample: Conventional Butyl

| Test (condition) | Test Method | Unit | Specified Value | Observed Value |
|---|---|---|---|---|
| Air Permeability | IS 3400 (Part 21) | M2/Pa · S | | $1.9 * 10^{-17}$ |

Sample: Natural Rubber Latex

| Test (condition) | Test Method | Unit | Specified Value | Observed Value |
|---|---|---|---|---|
| Air Permeability | IS 3400 (Part 21) | M2/Pa · S | | $5.3 * 10^{-17}$ |

Sample: Carboxylated Acrylonitrile Latex (Applicant's Bladder)

| Test (condition) | Test Method | Unit | Specified Value | Observed Value |
|---|---|---|---|---|
| Air Permeability | IS 3400 (Part 21) | M2/Pa · S | | $1.5 * 10^{-17}$ |

Sample Natural Rubber Latex

| Test (condition) | Test Method | Unit | Specified Value | Observed Value |
|---|---|---|---|---|
| 100% Modulus (Before Ageing) | ASTM D 412 | Kg/cm2 | | 10 |
| 300% Modulus (Before Ageing) | ASTM D 412 | Kg/cm2 | | 17 |
| Tensile Strength (Before Ageing) | ASTM D 412 | Kg/cm2 | | 363 |
| Elongation at Break (Before Ageing) | ASTM D 412 | % | | 900 |
| Rebound Resilience at RT | BS - 903 Part A8 Method A | % | | 76.86 |

Sample: Conventional Butyl

| Test (condition) | Test Method | Unit | Specified Value | Observed Value |
|---|---|---|---|---|
| 100% Modulus (Before Ageing) | ASTM D 412 | Kg/cm2 | | 28 |
| 300% Modulus (Before Ageing) | ASTM D 412 | Kg/cm2 | | 78 |
| Tensile Strength (Before Ageing) | ASTM D 412 | Kg/cm2 | | 164 |
| Elongation at Break (Before Ageing) | ASTM D 412 | % | | 520 |
| Rebound Resilience at RT | BS - 903 Part A8 Method A | % | | 35.06 |

Sample: Carboxylated Acrylonitrile Rubber Latex (Applicant's Bladder)

| Test (condition) | Test Method | Unit | Specified Value | Observed Value |
|---|---|---|---|---|
| 100% Modulus (Before Ageing) | ASTM D 412 | Kg/cm2 | | 17 |
| 300% Modulus (Before Ageing) | ASTM D 412 | Kg/cm2 | | 27 |
| Tensile Strength (Before Ageing) | ASTM D 412 | Kg/cm2 | | 112 |
| Elongation at Break (Before Ageing) | ASTM D 412 | % | | 770 |
| Rebound Resilience at RT | BS - 903 Part A8 Method A | % | | 62.41 |

We claim:

1. A seamless bladder having a combination of good air retention characteristics as well as good bounce characteristics for inflatable balls, characterized in that the bladder is made from carboxylated acrylonitrile butadiene latex and no other latex:
   wherein the said bladder has weight varying from about 500 mg/inch$^2$ to about 1.5 g/inch$^2$;
   wherein the said bladder has thickness varying from about 0.30 mm to 3.0 mm;
   wherein the said bladder does not have cracks therein;
   wherein the said bladder has modulus varying from about 17 to 20 Kg/Cm$^2$ at 100% stretch or elongation;
   wherein the said bladder's tensile strength varies from about 150 to 180 kg/cm$^2$;
   wherein the said bladder has elongation at break varying from 650 to 750%.

2. A bladder as claimed in claim 1, wherein the carboxylated acrylonitrile butadiene latex is characterized by:—
- acrylonitrile copolymer with medium or high acrylonitrile level varying from about 26% to about 39%;
- solid content varying from about 39% to about 50% of dry rubber contents;
- pH value varying from about 7.5 to about 8.5;
- viscosity varying from about 14 to about 65 mPas;
- surface tension varying from about 30 to about 40 mN/m.

3. A process for manufacturing a bladder as claimed in claim 1 having combination of good air retention characteristics as well as good bounce characteristics for inflatable balls, and wherein the process comprises following steps:—
- a) cleaning the multiple moulds by rinsing in an acid bath;
- b) heating the rinsed formers obtained from process step-a) by dipping in hot water;
- c) dipping the heated moulds from process step-b) in a coagulant bath;
- d) drying the coagulant coated formers obtained from process step-c);
- e) dipping the dried and coagulant coated formers obtained in process step-d) in compounded latex bath of carboxylated acrylonitrile butadiene latex;
- f) drying the latex coated coagulated films obtained from process step-e);
- g) beading the substantially dried latex coated coagulated films obtained from process step-f) to form a bead followed by leaching;
- h) drying and vulcanizing the leached formers with bladder obtained from process step-g);
- i) cooling and washing the vulcanized bladders obtained from process step-h); and
- j) stripping the cooled and washed bladders obtained from process step-i) from the respective moulds [formers];
- wherein the process is characterized by:—
  - dipping the moulds in a coagulant bath while these are hot and having a temperature varying from about 50° C. to 70° C., and the coagulant bath is maintained at a temperature varying from about 20° C. to about 80° C.; and
  - dipping the dried and coagulant coated formers in a compounded latex bath of carboxylated acrylonitrile butadiene latex when it is maintained at a temperature varying from about 10° C. to 30° C.

4. A process for manufacturing a bladder as claimed in claim 3, wherein the process comprises following steps:—
- a) cleaning multiple moulds by rinsing in an acid bath;
- b) heating the rinsed formers obtained from process step-a) by dipping in hot water;
- c) dipping the heated moulds from process step-b) in first coagulant bath;
- d) drying the coagulant coated formers obtained from process step-c);
- e) dipping the dried and coagulant coated formers obtained in process step-d) in first compounded latex bath of carboxylated acrylonitrile butadiene latex;
- f) drying the latex coated coagulated films obtained from process step-e);
- g) dipping the dried latex coated coagulated films obtained from process step-f) in second coagulant bath;
- h) drying the second coagulant coated latex films obtained from process step-g);
- i) dipping the dried and second coagulant coated latex films obtained in process step-h) in second compounded latex bath of carboxylated acrylonitrile butadiene latex;
- j) drying the latex coated coagulated film obtained from process step-i);
- k) beading the substantially dried latex coated coagulated films obtained from process step-j) to form a bead followed by leaching;
- l) drying and vulcanizing the leached formers with bladder obtained from process step-k);
- m) cooling and washing the vulcanized bladders obtained from process step-l); and
- n) stripping the cooled and washed bladders obtained from process step-m) from the respective moulds [formers];
- wherein the process is characterized by:—
  - dipping the moulds in a coagulant bath while these are hot and having a temperature varying from about 50° C. to 70° C., and the coagulant bath is maintained at a temperature varying from about 20° C. to about 80° C.;
  - dipping the dried and coagulant coated formers in a compounded latex bath of carboxylated acrylonitrile butadiene latex when it is maintained at a temperature varying from about 10° C. to 30° C.;
  - the latex coated coagulated films obtained from process step-e) are not fully dried to avoid complete removal of moisture contents therefrom;
  - the semi-dried latex coated coagulated films obtained from process step-f) are dipped in second or subsequent coagulant bath while these are maintained at a temperature varying from about 20° C. to about 80° C.;
  - the dried and coagulant coated latex films obtained from process step-h) are dipped in second or subsequent compounded latex bath of carboxylated acrylonitrile butadiene latex while maintaining the latex bath at a temperature varying from about 10° C. to 30° C.

5. A process as claimed in claim 4, wherein heated moulds are dipped into coagulant bath for a duration varying from about 15 sec to about 60 sec.

6. A process as claimed in claim 4, wherein dried and coagulant coated formers are dipped in compounded latex bath for a duration varying from about 15 sec to 300 sec.

7. A process as claimed in claim 4, wherein latex coated coagulated films are preferably dried in a hot air tunnel.

8. A process as claimed in claim 4, wherein temperature of said hot air tunnel is maintained within a range varying from about 40° C. to about 60° C.

9. A process as claimed in claim 4, wherein temperature of said hot air tunnel is maintained for a duration varying from about 5 to about 50 min.

10. A process as claimed in claim 4, wherein the semi-dried latex coated coagulated films are dipped in second or subsequent coagulant bath for a duration varying from about 5 sec to about 60 sec.

11. A process as claimed in claim 4, wherein the dried and second or subsequent coagulant coated latex films are dipped in second or subsequent compounded latex bath for a duration varying from about 15 sec to 300 sec.

12. A process as claimed in claim 4, wherein the leached formers with bladder shells are dried at about 40° C. which is gradually increased up to 90° C.

13. A process as claimed in claim 4, wherein the leached formers are dried for a duration of about 10 to 55 min.

14. A process as claimed in claim 4, wherein the vulcanization is carried out at a temperature varying from about 90° C. to about 170° C.

15. A process as claimed in claim 4, wherein the vulcanization is carried out for duration of about 10 to 55 min.

16. A process as claimed in claim 4, wherein the coagulant bath for first dip comprises:— coagulating agent varying from about 10 parts to about 90 parts by weight of the total weight of the bath composition;

parting agent varying from about 2 parts to about 8 parts by weight of the total weight of the bath composition; and optionally comprising a wetting agent varying from about 0.01 parts to about 0.5 parts by weight of the total weight of the bath composition; and optionally comprising a conventional defoamer or surface active agent varying from about 0.01 parts to about 0.5 parts by weight of the total weight of the bath composition;

which are dissolved in water.

17. A process as claimed in claim 4, wherein the coagulant bath for first dip comprises:— coagulating agent, which is preferably calcium chloride or calcium nitrate;

parting agent, which is preferably bentonite clay; and optionally comprising a wetting agent, which is preferably non-ionic group.

18. A process as claimed in claim 4, wherein the coagulant bath for second or subsequent dips comprises:— coagulating agent varying from about 10 parts to about 90 parts by weight of the total weight of the bath composition; and optionally comprises a wetting agent varying from about 0.01 parts to about 0.5 parts by weight of the total weight of the bath composition; and optionally comprises a conventional defoamer or surface active agent varying from about 0.01 parts to about 0.5 parts by weight of the total weight of the bath composition;

which are dissolved in water.

19. A process as claimed in claim 4, wherein the coagulant bath for second or subsequent dips comprises:— coagulating agent, which is preferably calcium chloride or calcium nitrate; and optionally comprises a wetting agent, which is preferably non-ionic group.

20. A process as claimed in claim 4, wherein the carboxylated acrylonitrile butadiene latex bath for all dips comprises dry parts of:— carboxylated acrylonitrile butadiene latex about 100 phr [per hundred rubber];

pH modifier varying from about 0.3 to about 0.8 phr;

surfactants varying from about 0.1 to about 3.0 phr;

activator and vulcanizing agent varying from about 0.5 to about 5 phr;

ultra fast accelerator varying from about 1 to about 3 phr;

vulcanizing agent varying from about 0.25 to about 3.0 phr;

plasticizer varying from about 1 to about 6 phr;

antioxident varying from about 1 to about 3 phr; and optionally comprising one or more of conventional colours, which are dissolved in water to have 25 to 55% of compounded latex bath.

21. A process as claimed in claim 4, wherein the carboxylated acrylonitrile butadiene latex bath for all dips comprises:— pH modifier which is preferably about 2 to 3% potassium hydroxide [KOH] solution;

surfactant which is selected from a group comprising anionic group;

activator and vulcanizing agent which is preferably 50% dispersion of zinc oxide;

ultra fast accelerator which is preferably 50% dispersion of zinc diethyl dithiocarbamate [ZDEC] or of zinc dibutyl dithiocarbamate [ZDBC];

vulcanizing agent which is preferably 50% dispersion of sulphur or 33% dispersion of diphenilthiourea [DPTU];

plasticizer which is preferably 50% emulsion of dioctylephthalate;

antioxidant which is preferably 50% dispersion or emulsion of phenol, amine, aniline or hydroquinone.

22. A process as claimed in claim 4, wherein the carboxylated acrylonitrile butadiene latex is characterized by:— acrylonitrile copolymer with medium or high acrylonitrile level varying from about 26% to about 39%;

solid content varying from about 39% to about 50% of dry rubber contents;

pH value varying from about 7.5 to about 8.5;

viscosity varying from about 14 to about 65 mPas;

surface tension varying from about 30 to about 40 mN/m.

23. A process as claimed in claim 4, wherein the bladder for inflatable balls is characterized by:— the bladder has modulus varying from about 17 to 20 Kg/Cm$^2$ at 100% stretch [or elongation]; tensile strength varying from about 150 to 180 kg/cm$^2$; elongation at break varying from 650 to 750%; and thickness varying from about 0.30 mm to 3.0 mm;

the bladder has weight varying from about 500 mg/inch$^2$ to about 1.5 g/inch$^2$;

the bladder has uniform weight and no joints; and the bladder is capable of providing required shape and size of the ball and protecting the outer cover from de-shaping and bursting on inflation of the inflatable balls.

* * * * *